United States Patent
Butterbach et al.

(10) Patent No.: US 10,689,551 B2
(45) Date of Patent: Jun. 23, 2020

(54) THERMALLY CONDUCTIVE ADHESIVE

(71) Applicant: HENKEL AG & CO. KGAA, Duesseldorf (DE)

(72) Inventors: Ruediger Butterbach, Essen (DE);
Patrick Markiefka, Duesseldorf (DE);
Carsten Schubert, Duesseldorf (DE);
Judith Siepenkothen, Ratingen (DE);
Siegfried Kopannia, Krefeld (DE)

(73) Assignee: HENKEL AG & CO. KGAA, Duesseldorf (DE)

(*) Notice: Subject to any disclaimer, the term of this patent is extended or adjusted under 35 U.S.C. 154(b) by 52 days.

(21) Appl. No.: 15/695,383

(22) Filed: Sep. 5, 2017

(65) Prior Publication Data

US 2017/0362473 A1    Dec. 21, 2017

Related U.S. Application Data

(63) Continuation of application No. PCT/EP2016/054368, filed on Mar. 2, 2016.

(30) Foreign Application Priority Data

Mar. 2, 2016    (EP) .................................... 15157884

(51) Int. Cl.
*C08J 11/04*    (2006.01)
*C09J 11/04*    (2006.01)
*C09K 5/14*    (2006.01)

(52) U.S. Cl.
CPC ................ *C09J 11/04* (2013.01); *C09K 5/14* (2013.01)

(58) Field of Classification Search
CPC .................................. C09J 11/04; C09K 5/14
See application file for complete search history.

(56) References Cited

U.S. PATENT DOCUMENTS

2013/0251989 A1    9/2013    Yoo et al.

FOREIGN PATENT DOCUMENTS

| EP | 1310751 A2 | 5/2003 |
|---|---|---|
| EP | 1637571 A2 | 3/2006 |
| JP | 2007-262392 A | 10/2007 |
| JP | 2008069195 A | 3/2008 |
| JP | 2008-186590 A | 8/2008 |
| JP | 2009-144072 A | 7/2009 |
| JP | 2010-205498 A | 9/2010 |
| JP | 2012-007090 A | 1/2012 |
| WO | 2004108851 A1 | 12/2004 |
| WO | 2013047145 A1 | 4/2013 |
| WO | 2013175950 A1 | 11/2013 |

OTHER PUBLICATIONS

"Very high thermal conductivity obtained by boron nitride-filled polybenzoxazine" Ishida et al, Therochimica Acta, Nov. 1998 (Year: 1998).*

* cited by examiner

*Primary Examiner* — Edward J Cain
(74) *Attorney, Agent, or Firm* — Sun Hee Lehmann

(57) ABSTRACT

The present invention relates to hotmelt adhesives with improved thermal conductivity, uses thereof and methods for the manufacture of articles with improved thermal conductivity using said adhesive compositions. The adhesive compositions of the invention comprise at least one (co) polymer binder and combination of different fillers, as defined herein.

11 Claims, No Drawings

THERMALLY CONDUCTIVE ADHESIVE

FIELD OF THE INVENTION

The present invention relates to adhesives, preferably hot melt adhesives, with improved thermal conductivity, uses thereof and methods for the manufacture of composites with improved thermal conductivity using said adhesive compositions.

BACKGROUND OF THE INVENTION

Adhesives which are thermally conductive are employed in several applications where a component has to be fixed upon a structure and where heat has to be deflected from the component. Many applications are therefore in the electronic components in heat exchangers. In particular heat exchangers like refrigerators can benefit by employing the present composition.

The object of current designs of refrigerator construction is to provide the cooled interior of the refrigerator or cabinet cooler with a volume as large as possible while at the same time provide for smooth inner walls that are easy to clean and maintain. This excludes the presence of protruding evaporator elements in the interior, as they were common in previous constructions. On the other hand, the aim is to keep energy consumption to a minimum. For this, a highly efficient heat transfer from the interior that is to be cooled to the evaporator units of a conventional refrigerator using vapor-compression refrigeration is required.

Presently, refrigerator/cabinet cooler constructions are used that have an inner shell or inner lining that allow a smooth walled design of the cooled interior. The evaporator units are arranged on the outside of said inner lining, with said evaporator units typically having the form of coils. This inner lining with the evaporator units is arranged in an outer housing, wherein the space in-between the outer housing and the inner lining is typically filed with heat insulating foam for thermal isolation. The inner lining of the refrigeration unit is commonly made of impact resistant plastics, in particular acrylonitrile butadiene styrene (ABS) terpolymers. The outer housing or the outer shell of the refrigeration unit is commonly made of plastics or thin metal plates.

EP-A-1 310 751 suggests to increase the energy efficiency of refrigerators by use of metallic films or metallized polymer films on the walls of the refrigerator unit, wherein said films are arranged internally, externally or as layers on or in the walls of the refrigerator unit.

Furthermore, it is known to arrange thin metal plates, for example aluminum plates, as heat conductive plating on the outer surface of the inner lining of the refrigerator unit. It is common to use double-sided adhesive strips or adhesive compositions to fixate said metal plates on the outer surface of the inner lining.

A drawback of this known approach is that the adhesive strips or adhesive compositions impair the heat transfer from the interior of the refrigerator unit to the evaporator units on the outer side of the inner lining.

EP-A-1 637 571 describes that said drawback can be overcome by use of thermally conductive filler materials in the adhesive compositions. These filler materials, while increasing the thermal conductivity, can cause an undesired increase in viscosity and/or impair the mechanical and adhesive properties of the composition or are too expensive to be economically useful.

There is thus still need in the art for adhesive compositions that exhibit excellent thermal conductivity while the negative effects on viscosity, mechanical properties and adhesiveness are minimized.

SUMMARY OF THE INVENTION

The inventors surprisingly found that this object can be met by providing a hotmelt adhesive composition comprising a combination of at least three specific fillers, with said composition having an excellent thermal conductivity while retaining a viscosity that allows easy use and application of the adhesive composition.

In a first aspect, the present invention is thus directed to an adhesive composition which is suitable as a thermally conductive adhesive composition, preferably a thermoplastic composition, more preferably a hotmelt composition, comprising:

(1) at least one filler, wherein said at least one filler is selected from the group consisting of expanded clay, expanded graphite, expanded mica, expanded shale, expanded vermiculite, pumice, scoria, ceramic microspheres, diatomaceous earth, perlite, fumed silica or combinations thereof;

(2) at least one filler different from (1), wherein said at least one filler different from (1)
   (i) has an aspect ratio of 1 to 10, preferably 2 to 9, more preferably 4 to 8, most preferably 5 to 7.5; and/or
   (ii) is selected from the group consisting of thermally conductive metal oxides, preferably tin oxide, indium oxide, antimony oxide, aluminum oxide, titanium oxide, iron oxide, magnesium oxide, zinc oxide, oxides of rare earth metals; alkaline and alkaline earth metal sulfates; chalk; alkaline silicate; silica; ball-shaped metal fillers, preferably selected from iron, copper, aluminum, zinc, gold, silver and tin; alkaline and alkaline earth metal halides; alkaline and alkaline earth metal phosphates; and combinations thereof;

(3) at least one filler different from (1) and (2), wherein said at least one filler different from (1) and (2)
   (i) has an aspect ratio of more than 10, preferably 10.5 to 100, more preferably 20 to 70, most preferably 30 to 60; and/or
   (ii) is selected from the group consisting of flaky metal fillers, preferably iron, copper, aluminum, zinc, gold, silver, and tin; aluminum nitrides; silicon nitrides; boron nitrides; carbon black; flaky silicates, preferably wollastonite; alkaline and alkaline earth metal carbonates; aluminum hydroxide; magnesium hydroxide; alkaline borates; and combinations thereof;

(4) at least one (co)polymer, preferably selected from the group consisting of polyamides, preferably thermoplastic polyamides, polyolefins, preferably alpha-olefins, more preferably butyl rubber or polybutene, poly(meth)acrylates, polystyrene, polyurethanes, preferably thermoplastic polyurethane, polyesters, ethylene copolymers, ethylene vinyl copolymers, styrenic block copolymers, preferably styrene-butadiene (SB), styrene-ethylene-butadiene-styrene (SEBS), styrene-isoprene (SI), styrene-isoprene-styrene (SIS), styrene-butadiene-styrene (SBS), styrene-isoprene-butadiene (SIB), or styrene-isoprene-butadiene-styrene (SIBS), polylactic acid (PLA), copolyamides, silicones, epoxies, polyols or combinations thereof;

(5) optionally at least one tackifier; and (6) optionally at least one additive, preferably selected from the group consisting of plasticizers, dyes, adhesion promoters, waxes, antioxidants, surfactants, stabilizers, rheology modifiers, cross-linking agents, and combinations thereof.

In another aspect, the present invention is directed to a method of manufacturing an article comprising at least two bonded substrates, comprising
(A) applying the adhesive composition of the present invention to the surface of a first substrate to be bonded; and
(B) bringing the surface of the first substrate to be bonded comprising the adhesive composition into contact with a second substrate to be bonded; and
(C) optionally repeating steps (A) and (B) with a third or further substrate to be bonded.

In still another aspect, the invention also encompasses an article obtainable according to the methods described herein.

In a further aspect, the invention also covers the use of the adhesive composition as described herein in pipes, preferably cooling coils; in electronic components, preferably in light emitting devices, computer devices, mobile phones, tablets, touch screens, automotive technology HiFi systems, and audio systems; in joints between heat pipes and water tanks in solar heated heating; in fuel cells and wind turbines; in the manufacture of computer chips; in light devices; batteries; in housings; coolers; heat exchanging devices; wires; cables; heating wires; refrigerators; dishwashers; air conditionings; accumulators; transformers; lasers; functional clothing; car seats; medical devices; fire protection; electric motors; planes; and trains.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polymer" means that at least one type of molecule falling within the definition for a polymer is used but that also two or more different molecule types falling within this definition can be present, but does not mean that only one molecule of said polymer is present.

If reference is made herein to a molecular weight of a polymer, this reference refers to the average number molecular weight $M_n$, if not explicitly stated otherwise. The number average molecular weight $M_n$ of a polymer can, for example, be determined by gel permeation chromatography according to DIN 55672-1:2007-08 with THF as the eluent. If not stated otherwise, all given molecular weights are those determined by GPC, calibrated with polystyrene standards. The weight average molecular weight $M_w$ can also be determined by GPC, as described for $M_n$.

All percentages given herein in relation to the compositions or formulations relate to weight % relative to the total weight of the respective composition or formula, if not explicitly stated otherwise.

"About" or "approximately" as used herein in connection with a numerical value refers to the numerical value ±10%, preferably ±5%. "About 0.600 W/(m*K)" thus relates to 0.6±0.06, preferably 0.6±0.03 W/(m*K).

"Aspect ratio" as employed herein refers to an average aspect ratio of 50, preferably 100, particles of the respective filler as measured in accordance with the below-mentioned measurement method.

DETAILED DESCRIPTION OF THE INVENTION

The present invention is based on the inventor's surprising finding that incorporation of a combination of different thermally conductive filler materials, more particularly at least three different filler materials, into an adhesive composition can on the one hand provide for a synergistic increase in thermal conductivity while maintaining desirable values for viscosity and retaining adhesive and mechanical properties.

The adhesive compositions described herein are suitable as a thermally conductive adhesive composition by virtue of the specific filler combination used. In various embodiments, the adhesive compositions are thermoplastic compositions, preferably hotmelt compositions, more preferably hotmelt pressure sensitive adhesives (HMPSA). These HMPSA adhesives are characterized in that they are applied to the substrate in molten state and provide for sufficient bonding strength at room temperature without the need for activation by a solvent or heat simply by pressing together the two substrates to be bonded.

Important characteristics of all adhesives of the present invention are that their specific adhesive strength is high enough for bonding two substrates, preferably metals and unpolar polymers, such as metal plates and ABS that are used in refrigerator units. In addition, the adhesives should provide for good wetting properties on the substrates, which is important for fast initial adhesion, and good cohesive strength. Further, they need to have the desired high thermal conductivity to allow efficient heat transfer. In particular from the plastic inner lining to the metal plates when employed in a refrigerator unit. Finally, they preferably have good adhesive strength and mechanical resistance at temperatures below room temperature, in particular at subzero temperatures.

The adhesive compositions of the invention therefore have to include adhesive agents that meet the above adhesive requirements and at the same time materials that provide for the improved thermal conductivity.

The fillers used in the compositions of the invention comprise at least one filler selected from the group consisting of expanded clay, expanded graphite, expanded mica, expanded shale, expanded vermiculite, pumice, scoria, ceramic microspheres, diatomaceous earth, perlite, fumed silica or combinations thereof; at least one filler different from (1) and having an aspect ratio of 1 to 10, preferably 2 to 9, more preferably 4 to 8, most preferably 5 to 7.5; and at least one filler different from (1) and (2) having an aspect ratio of more than 10, preferably 10.5 to 100, more preferably 20 to 70, most preferably 30 to 60.

In various embodiments, the filler different from (1) and having an aspect ratio of 1 to 10 may be selected from the group consisting of thermally conductive metal oxides, preferably tin oxide, indium oxide, antimony oxide, aluminum oxide, titanium oxide, iron oxide, magnesium oxide, zinc oxide, oxides of rare earth metals; alkaline and alkaline earth metal sulfates; chalk; alkaline silicate; silica; ball-shaped metal fillers, preferably selected from iron, copper, aluminum, zinc, gold, silver and tin; alkaline and alkaline earth metal halides; alkaline and alkaline earth metal phosphates; and combinations thereof.

The at least one filler different from (1) and (2) having an aspect ratio of more than 10 may, in various embodiments, be selected from the group consisting of flaky metal fillers, preferably iron, copper, aluminum, zinc, gold, silver, and tin; aluminum nitrides; silicon nitrides; boron nitrides; carbon black; flaky silicates, preferably wollastonite; alkaline and alkaline earth metal carbonates; aluminum hydroxide; magnesium hydroxide; alkaline borates; and combinations thereof.

In other embodiments, the adhesive composition comprises a filler combination including: at least one first filler selected from the group consisting of expanded clay, expanded graphite, expanded mica, expanded shale, expanded vermiculite, pumice, scoria, ceramic microspheres, diatomaceous earth, perlite, fumed silica or combinations thereof; at least one second filler, different from the first filler, selected from thermally conductive metal oxides, preferably tin oxide, indium oxide, antimony oxide, aluminum oxide, titanium oxide, iron oxide, magnesium oxide, zinc oxide, oxides of rare earth metals; alkaline and alkaline earth metal sulfates; chalk; alkaline silicate; silica; ball-shaped metal fillers, preferably selected from iron, copper, aluminum, zinc, gold, silver and tin; alkaline and alkaline earth metal halides; alkaline and alkaline earth metal phosphates; and combinations thereof; and at least one third filler, different from the first filler, selected from the group consisting of flaky metal fillers, preferably iron, copper, aluminum, zinc, gold, silver, and tin; aluminum nitrides; silicon nitrides; boron nitrides; carbon black; flaky silicates, preferably wollastonite; alkaline and alkaline earth metal carbonates; aluminum hydroxide; magnesium hydroxide; alkaline borates; and combinations thereof. In these embodiments, the second filler may have an aspect ratio of 1 to 10, preferably 2 to 9, more preferably 4 to 8, most preferably 5 to 7.5 and/or the third filler may have an aspect ratio of more than 10, preferably 10.5 to 100, more preferably 20 to 70, most preferably 30 to 60.

"Aspect ratio", as used herein, relates to the ratio between sizes in different dimensions of a three-dimensional object, more particularly the ratio of the longest side to the shortest side, for example height to width. Ball-shaped or spherical particles therefore have an aspect ratio of about 1, while fibres, needles or flakes tend to have aspect ratios of more than 10, as they have in relation to their length or length and width a comparable small diameter or thickness. The aspect ratio can be determined by scanning electron microscopy (SEM) measurements. As the software, "Analysis pro" from Olympus Soft Imaging Solutions GmbH can be used. The magnification is between ×250 to ×1000 and the aspect ratio is a mean value obtained by measuring the width and the length of at least 50, preferably 100 particles in the picture. In case of relatively big and flaky fillers, the SEM measurements can be obtained with a tilt angle of 45° of the sample.

In various embodiments, the at least one filler (1) (or first filler) has an average particle size of 2 to 150 µm, preferably 5 to 120 µm, more preferably 10 to 100 µm, most preferably 20 to 80 µm.

Preferably, the at least one filler (2) (or second filler) has an average particle size of 0.5 to 100 µm, preferably 1 to 80 µm, more preferably 2 to 50 µm, most preferably 3 to 25 µm.

The at least one filler (3) (or third filler) has, in various embodiments, an average particle size of 1 to 100 µm, preferably 2 to 80 µm, more preferably 5 to 70 µm, most preferably 10 to 60 µm.

The particle size can, for example, be determined by laser diffraction method according to ISO 13320:2009.

Generally, it can be preferable to use a bimodal or trimodal particle size distribution to allow for dense packing of the filler in the binder matrix.

In the adhesive compositions described herein, the at least one filler (1) may be contained in the adhesive composition in an amount of less than 10 wt.-%, preferably 0.1 to 5 wt.-%, more preferably 0.5 to 4 wt.-% based on the total weight of the adhesive composition. The at least one filler (2) may be contained in the adhesive composition in an amount of less than 65 wt.-%, preferably 10 to 55 wt.-%, more preferably 30 to 50 wt.-% based on the total weight of the adhesive composition. The at least one filler (3) may be contained in the adhesive composition in an amount of less than 25 wt.-%, preferably 2.5 to 20 wt.-%, more preferably 5 to 15 wt.-% based on the total weight of the adhesive composition. In various embodiments, the adhesive compositions of the invention comprise less than 10 wt.-%, preferably 0.1 to 5 wt.-%, more preferably 0.5 to 4 wt.-% based on the total weight of the adhesive composition of at least one filler (1); less than 65 wt.-%, preferably 10 to 55 wt.-%, more preferably 30 to 50 wt.-% based on the total weight of the adhesive composition of at least one filler (2); and less than 25 wt.-%, preferably 2.5 to 20 wt.-%, more preferably 5 to 15 wt.-% based on the total weight of the adhesive composition of at least one filler (3). In preferred embodiments, the compositions comprise 0.5 to 4 wt.-% based on the total weight of the adhesive composition of at least one filler (1); 30 to 50 wt.-% based on the total weight of the adhesive composition of at least one filler (2); and 5 to 15 wt.-% based on the total weight of the adhesive composition of at least one filler (3).

In various embodiments, the total amount of fillers in the adhesive composition, in particular the total amount of the fillers (1), (2) and (3) is less than 80 wt.-%, preferably less than 70 wt.-%, more preferably less than 60 wt.-% based on the total weight of the adhesive composition. The total amount of the fillers (1), (2) and (3) in the adhesive composition is in various embodiments at least 10 wt.-%, preferably at least 20 wt.-%, more preferably at least 30 wt.-% based on the total weight of the adhesive composition.

In preferred embodiments, the first filler, i.e. filler (1), comprises or consists of expanded graphite. In further preferred embodiments, the second filler, i.e. filler (2), comprises or consists of aluminum oxide. In still further preferred embodiments, the third filler, i.e. filler (3) comprises or consists of boron nitride or aluminum flakes.

The adhesive compositions further comprise (co)polymers as binding agents. The term (co)polymers includes homopolymers, copolymers, block copolymers and terpolymers. In particular suitable are elastomeric (co)polymers, more preferably elastomeric thermoplastic (co)polymers. Exemplary (co)polymers that are suitable as components of the binder matrix of the inventive compositions include, without limitation, polyamides, preferably thermoplastic polyamides, polyolefins, preferably alpha-olefins, more preferably butyl rubber or polybutene, poly(meth)acrylates, polystyrene, polyurethanes, preferably thermoplastic polyurethane, polyesters, ethylene copolymers, ethylene vinyl copolymers, styrenic block copolymers, preferably styrene-butadiene (SB), styrene-ethylene-butadiene-styrene (SEBS), styrene-isoprene (SI), styrene-isoprene-styrene (SIS), styrene-butadiene-styrene (SBS), styrene-isoprene-butadiene (SIB), or styrene-isoprene-butadiene-styrene (SIBS), polylactic acid (PLA), copolyamides, silicones, epoxies, polyols or combinations thereof. Thermoplastic polyurethanes are employed in a preferred embodiment. Preferred ethylene vinyl copolymers include ethylene vinyl acetate copolymers (EVA). Other preferred (co)polymers are acrylate copolymers and atactic polypropylene. Particularly suited are block copolymers of the A-B, A-B-A, A-(B-A)$_n$-B- and (A-B)$_n$-Y type, wherein A is an aromatic polyvinyl block and B is an rubber-like middle block, which can be partially or completely hydrogenated. Specific examples are those wherein A is a polystyrene block and B is an essentially rubber-like polybutadiene or polyisoprene block. Y can be a polyvalent compound and n is an integer of at least 3. To improve heat resistance, the middle block B can be partially hydrogenated, so that at least a part of the C—C double bonds is removed. Examples for such block copolymers are styrene-butadiene (SB), styrene-ethylene-butadiene-styrene (SEBS), styrene-isoprene (SI), styrene-isoprene-styrene (SIS), styrene-butadiene-styrene (SBS), styrene-isoprene-butadiene (SIB), styrene-isoprene-butadiene-styrene (SIBS), which are commercially available from various manufacturers. Preferred (co)polymers in the compositions of the invention are thermoplastic polyamides, polyurethanes, polyolefins, and the afore-mentioned block copolymers.

The composition may further comprise at least one tackifier. Exemplary tackifiers that can be used include, but are not limited to, abietic acid, abietic acid esters, terpene resins, terpene phenolic resins, poly-alpha-methylstyrene, phenol-modified styrene polymers, phenol-modified alpha-methyl-styrene polymers, resorcinol resins, hydrocarbon resins, in particular aliphatic, aromatic or aromatic-aliphatic hydrocarbon resins or cumarone-indene resins, or mixtures of tackifiers and adhesion promoters.

The composition can further comprise one or more additional additives, preferably selected from the group consisting of plasticizers, dyes, adhesion promoters, waxes, antioxidants, surfactants, stabilizers, rheology modifiers, cross-linking agents, and combinations thereof.

Waxes can, for example, be used in combination with the above defined tackifiers. Exemplary waxes that can be used include, without limitation, polar waxes selected from functionalized polyolefins with a molecular weight $M_N$ range as determined by GPC between about 4000 and 80000 and based on ethylene and/or propylene with acrylic acid, methacrylic acid, C1-4 alkyl esters of (meth)acrylic acid, itaconic acid, fumaric acid, vinyl acetate, carbon monoxide, and in particular maleic acid and mixtures thereof. Preferred are ethylene, propylene or ethylene-propylene (co)polymers grafted or copolymerized with polar monomers with saponification and acid values, respectively, between 2 and 50 mg KOH/g. Saponification and acid values can be determined by titration.

The rheology of the compositions and/or the mechanical properties of the glue joint can be adjusted by the addition of so-called extender oils, i.e. aliphatic, aromatic or naphthenic oils, low molecular weight polybutenes or polyisobutylenes. Additionally poly-alpha-olefins which are liquid at 25° C. can be employed which are commercially available for example under the tradename Synfluid PAO. Also conventional plasticizers, such as dialkyl or alkylaryl esters of phthalic acid or dialkyl esters of aliphatic dicarboxylic acids can be used, optionally in admixture with the afore-mentioned extender oils.

Suitable stabilizers that can be used in the compositions of the invention include, without limitation, 2-(hydroxyphenyl)-benzotriazole, 2-hydroxybenzophenone, alkyl-2-cyano-3-phenylcinnamate, phenylsalicylate or 1,3,5-tris(2'-hydroxyphenyl)triazine. Suitable antioxidants include, without limitation, those commercially available under the trademark name Irganox® (BASF, SE). Also suitable are distearyl-pentaerythritdiphosphate compounds, octadecyl esters of 3,5-bis(1,1-dimethylethyl)-4-hydroxybenzylpropanoic acid (Irganox® 1076), 2,4-bis(n-octylthio)-6-(4-hydroxy-3,5-di-tert-butylanilino)-1,3,5-triazine (Irganox® 565), 2-tert-butyl-6-(3-tert-butyl-2-hydroxy-5-methylbenzyl)-4-methylphenylacrylate, phosphite antioxidants, such as tris(nonylphenyl)phosphite (TNPP), tris(mono-nonylphenyl)phosphite, and tris(di-nonylphenyl)phosphite, bis(2,4-di-tert-butylphenyl)pentaerythrit diphosphate, tris(2,4-di-tert-butylphenyl)phosphite and combinations or 2 or more of the afore-mentioned compounds.

In preferred embodiments, the adhesive composition of the invention comprises 5 to 50 wt.-%, preferably 10 to 50 wt.-% of the at least one (co)polymer, 5 to 80 wt.-% of the fillers (1), (2) and (3), as defined above, 0 to 50 wt.-%, preferably 20 to 70 wt.-% of at least one tackifier and/or adhesion promoter, 0 to 40 wt.-% of a plasticizer or extender oil, and 0 to 10 wt.-% of further additives selected from dyes, antioxidants, stabilizers, and rheology modifiers, with the components adding up to 100 wt.-%.

The compositions of the invention can be produced by conventional means. Preferred methods include the manufacture by mixers, for example planetary mixer, planetary dissolver, kneader, internal mixer and extruder.

The preferred field of application of the inventive compositions is the gluing of thermally conductive elements, such as metal plates or metal tubing, in particular aluminum pipes, on the outer surface of the inner lining of refrigerator units.

The present invention also covers method for bonding two substrates and for producing an article of manufacture by bonding two substrates. In these methods, the adhesive composition of the invention is applied in molten state onto the substrate surface, for example by a roll coating or by bead application. The substrate surface with the adhesive is then pressed onto the other substrate to be bonded. The substrate may include metal plates that are used for heat transfer in refrigerator units and/or evaporator coils that are typically also made from metals, in particular aluminum. The adhesive compositions of the invention may therefore be used to bond metal plating as well as evaporator coils or tubing to a plastic or metal substrate, in particular in refrigerator units. In these applications the thermal conductivity of the adhesive is of particular importance. The thus produced bonded substrate or article, such as the inner lining of a refrigerator unit, is then placed in the outer housing and the space between inner lining and outer housing is filled with thermally insulating foam.

Accordingly, in various embodiments, the invention is directed to a method of manufacturing an article comprising at least two bonded substrates, comprising
  (A) applying the adhesive composition according to the present invention to a surface of a first substrate to be bonded; and
  (B) bringing the surface of the first substrate to be bonded comprising the adhesive composition into contact with a second substrate to be bonded.

Depending on the number of substrates to be bonded, steps (A) and (B) may be repeated to bond a third or further substrate to the already bonded substrates.

Also encompassed by the present invention are the articles of manufacture that are obtainable according to the methods described herein and that include the adhesives described herein.

The thermal conductivity can be determined according to the transient plane heat source (hot disc) method (ISO 22007-2:2008). The measurement was conducted by room temperature (25° C.).

In various embodiments, the adhesive compositions of the invention have thermal conductivities of at least 0.600 W/(m*K), preferably at least 0.700 W/(m*K), more preferably at least 0.750 W/(m*K), most preferably at least 0.800 W/(m*K), as determined according to the above method.

In various embodiments, while having a high thermal conductivity, the adhesive compositions still retain a viscosity that allows simple application to the substrate. More particularly, in preferred embodiments, the viscosity of the adhesive composition is 500 to 500,000 mPas at 200° C., preferably 5,000 to 250,000 mPas at 200° C., more preferably 10,000 to 150,000 mPas at 200° C. The viscosity can be determined according to ASTM D 3236, except that the temperature was 180° C., 190° C. or 200° C. instead of 175° C.

The adhesive compositions described herein can be used in various fields, including but not limited the manufacture of refrigerator units and electronic devices. More specifically, they can be used in the manufacturing and bonding of pipes, preferably cooling coils; electronic components, preferably in light emitting devices, computer devices, mobile phones, tablets, touch screens, and audio systems; automotive technology; in joints between heat pipes and water tanks in solar heated heating; in fuel cells and wind turbines; in the manufacture of computer chips; in light devices; batteries; in housings; coolers; heat exchanging devices; wires, such as heating wires; cables; refrigerators; dishwashers; air conditionings; accumulators; transformers; lasers; functional clothing; car seats; medical devices; fire protection; electric motors; planes; and trains.

The invention is further illustrated by the following examples. It is however understood that these examples are for purpose of illustration only and not to be construed as limiting the invention.

EXAMPLES

Examples 1 to 3 and Comparative Examples V1 to V6

Different adhesive compositions were prepared with their compositions shown in Table 1. To obtain the compositions, first the (co)polymer and optionally the tackifier(s) and/or additive(s) were heated until the (co)polymer is molten and then mixed until a homogenous phase is obtain. To this phase, the fillers are subsequently given in any order. The final composition is then thoroughly mixed and allowed to cool to room temperature.

TABLE 1

Adhesive compositions

| | Component/Formulation | | | | | | | | |
|---|---|---|---|---|---|---|---|---|---|
| | V1 | V2 | E1 | V3 | V4 | E2 | V5 | V6 | E3 |
| PSA (SIS based) | 40 | 40 | 40 | — | — | — | — | — | — |
| Polyamide | — | — | — | 59.5 | 59.5 | 59.5 | — | — | — |
| Polyolefin | — | — | — | — | — | — | 49.4 | 49.4 | 49.4 |
| Expanded graphite | — | — | 1.0 | — | — | 1.0 | — | — | 1.0 |
| Aluminum oxide (aspect ratio: 7) | 60.0 | 55.0 | 54.0 | 40.5 | 33.0 | 32.0 | 50.6 | 41.0 | 40.0 |
| Aluminum flakes (aspect ratio: 40) | — | — | — | — | — | — | — | 9.6 | 9.6 |
| Boron nitride (aspect ratio: 14) | — | 5.0 | 5.0 | — | 7.5 | 7.5 | — | — | — |

(all amounts are in wt.-% relative to the total weigh of the composition;
V = comparative example;
E = example)

The adhesive formulations were then tested with respect to their thermal conductivity and viscosities. The results are shown in Table 2.

TABLE 2

Thermal conductivities/viscosities

| | Component/Formulation | | | | | | | | |
|---|---|---|---|---|---|---|---|---|---|
| | V1 | V2 | E1 | V3 | V4 | E2 | V5 | V6 | E3 |
| Thermal conductivity (W/(m*K)) | 0.459 | 0.711 | 0.874 | 0.418 | 0.665 | 0.773 | 0.407 | 0.693 | 0.831 |
| Viscosity (mPas): | | | | | | | | | |
| @180° C. | 121250 | 119792 | 120000 | 10325 | 17150 | 27800 | 6000 | 5900 | 12100 |
| @190° C. | 70000 | 72875 | 74667 | 6087 | 10050 | 14900 | 4900 | 4525 | 9300 |
| @200° C. | 46033 | 45563 | 48700 | 3568 | 5666 | 9425 | 4100 | 3587 | 7400 |
| Color | white | white-yellow | gray | white-yellow | white-yellow | gray | light beige | gray | silver gray |

It can be seen from the examples and comparative examples that a significantly improved thermal conductivity can be obtained by compositions according to the present invention, which employ at least three different specific fillers.

The invention claimed is:

1. An adhesive composition comprising:
   (1) a first filler selected from the group consisting of expanded clay, expanded graphite, expanded mica, expanded shale, expanded vermiculite, pumice, scoria, ceramic microspheres, diatomaceous earth, perlite, fumed silica and combinations thereof;
   (2) a second filler, which is different from the first filler, selected from the group consisting of tin oxide, indium oxide, antimony oxide, aluminum oxide, titanium oxide, iron oxide, magnesium oxide, zinc oxide, chalk, alkaline silicate, silica, ball-shaped iron, ball-shaped copper, ball-shaped aluminum, ball-shaped zinc, ball-shaped gold, ball-shaped silver, and ball-shaped tin, and combinations thereof;
   wherein the second filler has an aspect ratio of 1 to 10;
   (3) a third filler, which is different from the first filler, selected from the group consisting of flaky iron, flaky copper, flaky aluminum, flaky zinc, flaky gold, flaky silver, and flaky tin; aluminum nitrides, silicon nitrides, boron nitrides, carbon black, flaky silicates, flaky wollastonite, alkaline and alkaline earth metal carbonates, aluminum hydroxide, magnesium hydroxide, alkaline borates, and combinations thereof;
   wherein the third filler has an aspect ratio of more than 10;
   (4) a (co)polymer selected from the group consisting of thermoplastic polyamides, thermoplastic polyurethanes, thermoplastic polyolefins, styrene-butadiene (SB), styrene-ethylene-butadiene-styrene (SEBS), styrene-isoprene (SI), styrene-isoprene-styrene (SIS), styrene-butadiene-styrene (SBS), styrene-isoprene-butadiene (SIB), styrene-isoprene-butadiene-styrene (SIBS) copolymers, and combinations thereof;
   (5) optionally a tackifier; and
   (6) optionally an additive, selected from the group consisting of extender oils, plasticizers, dyes, adhesion promoters, waxes, antioxidants, surfactants, stabilizers, rheology modifiers, cross-linking agents, and combinations thereof.

2. The adhesive composition according to claim 1, wherein
   (a) the first filler has an average particle size of 2 to 150 μm; and/or
   (b) the second filler has an average particle size of 0.5 to 100 μm; and/or
   (c) the third filler has an average particle size of 1 to 100 μm.

3. The adhesive composition according to claim 1, wherein
   (a) the first filler is present in the adhesive composition in an amount of less than 10 wt-% based on the total weight of the adhesive composition; and/or
   (b) the second filler is present in the adhesive composition in an amount of less than 65 wt-% based on the total weight of the adhesive composition; and/or
   (c) the at third filler is present in the adhesive composition in an amount of less than 25 wt.-% based on the total weight of the adhesive composition.

4. The adhesive composition according to claim 1, wherein the first filler is expanded graphite, the second filler is aluminum oxide and the third filler is boron nitride or flaky aluminum.

5. The adhesive composition according to claim 1, wherein the total amount of the first filler, the second filler and third filler is less than 80 wt.-%, based on the total weight of the adhesive composition.

6. The adhesive composition according to claim 1, wherein the viscosity of the adhesive composition is 500 to 500,000 mPas at 200° C.

7. The adhesive composition according to claim 1, wherein the thermal conductivity of the adhesive composition is at least 0.600 W/(m*K).

8. A method of manufacturing an article comprising at least two bonded substrates, comprising:
   (A) applying the adhesive composition according to claim 1 to the surface of a first substrate to be bonded; and
   (B) bringing the surface of the first substrate to be bonded comprising the adhesive composition into contact with a second substrate to be bonded; and
   (C) optionally repeating steps (A) and (B) with a further substrate to be bonded.

9. An article obtained according to the method of claim 8.

10. The article of claim 9 which is an emitting device, computer device, mobile phone, tablet, touch screen, automotive technology hifi system, audio system, computer chip, battery, heat exchanging device, transformer, medical device or electric motor.

11. The adhesive composition according to claim 1, wherein
(1) the first filler is expanded clay;
(2) the second filler is aluminum oxide;
(3) the third filler is flaky aluminum or boron nitrides; and
(4) the (co)polymer is styrene-isoprene-styrene (SIS), polyadmie or polyolefin.

* * * * *